United States Patent [19]

Ueda

[11] Patent Number: 4,748,499
[45] Date of Patent: May 31, 1988

[54] DEMULTIPLEXING AND NOISE REDUCTION CIRCUIT FOR TIME DIVISION MULTIPLEXED SIGNAL

[75] Inventor: Kazuhiko Ueda, Yokohama, Japan

[73] Assignee: Victor Company of Japan, Ltd., Japan

[21] Appl. No.: 900,707

[22] Filed: Aug. 27, 1986

[30] Foreign Application Priority Data

Sep. 3, 1985 [JP] Japan ................. 60-194289

[51] Int. Cl.⁴ .............. H04N 5/217; H04N 9/077; H04N 9/64
[52] U.S. Cl. ........................ 358/36; 358/44; 358/340; 358/167
[58] Field of Search .............. 358/44, 41, 43, 36, 358/37, 167, 340

[56] References Cited

U.S. PATENT DOCUMENTS

| | | | |
|---|---|---|---|
| 4,242,704 | 12/1980 | Ito et al. ................. | 358/36 |
| 4,246,610 | 1/1981 | Takahashi ................ | 358/36 |
| 4,268,855 | 5/1981 | Takahashi ................ | 358/36 |
| 4,302,768 | 11/1981 | Kamura et al. .......... | 358/36 |
| 4,485,399 | 11/1984 | Schulz et al. ............ | 358/36 |
| 4,485,403 | 11/1984 | Illetschko ................ | 358/36 |
| 4,549,213 | 10/1985 | Illetschko ................ | 358/36 |
| 4,563,704 | 1/1986 | Hirota ..................... | 358/167 |
| 4,571,613 | 2/1986 | Fukuda .................... | 358/36 |
| 4,575,760 | 3/1986 | Nakagaki et al. ....... | 358/167 |
| 4,587,576 | 5/1986 | Hirota et al. ............ | 360/33.1 |
| 4,607,285 | 8/1986 | Hirota et al. ............ | 358/167 |
| 4,618,893 | 10/1986 | Hirota et al. ............ | 358/167 |
| 4,626,927 | 12/1986 | Hirota et al. ............ | 358/310 |
| 4,641,206 | 2/1987 | Iwafune .................. | 360/33.1 |
| 4,646,153 | 2/1987 | Fukuda et al. .......... | 358/167 |
| 4,682,251 | 7/1987 | Hirota et al. ............ | 360/33.1 |

Primary Examiner—James J. Groody
Assistant Examiner—Robert M. Bauer
Attorney, Agent, or Firm—Andrus, Sceales, Starke & Sawall

[57] ABSTRACT

A circuit for simultaneously obtaining in parallel signals constituting a time division multiplexed signal comprises a first delay circuit supplied with an input time division multiplexed signal and having a delay time corresponding to a duration of one of the signals constituting the time division multiplexed signal, a switching circuit supplied with an output signal of the first delay circuit and the input time division multiplexed signal for carrying out a switching operation for every constant repetition period so as to simultaneously output signals in parallel, a second delay circuit supplied with the output signal of the first delay circuit and having a delay time identical to that of the first delay circuit, an operation circuit supplied with the input time division multiplexed signal and an output signal of the second delay circuit for carrying out a subtraction or an addition, and a non-linear characteristic circuit having an input versus output characteristic which varies non-linearly. The non-linear characteristic circuit is supplied with an output signal of the operation circuit and feeds back an output signal thereof to the time division multiplexed signal.

7 Claims, 3 Drawing Sheets

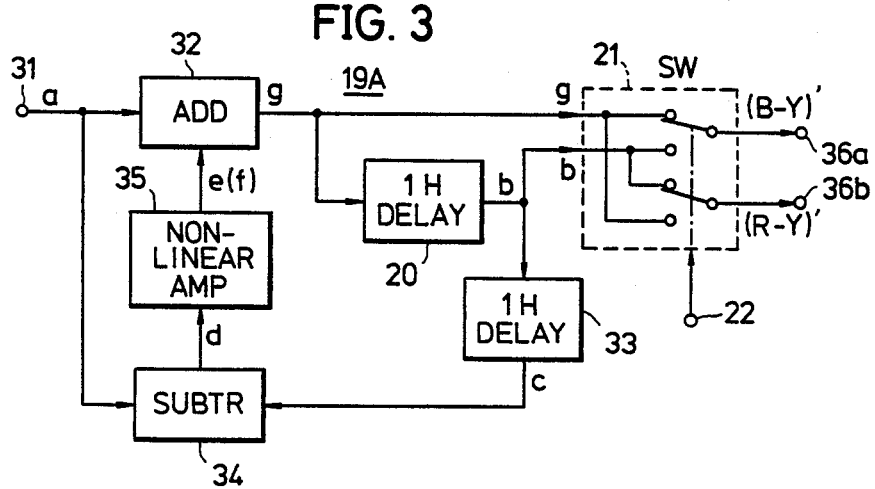
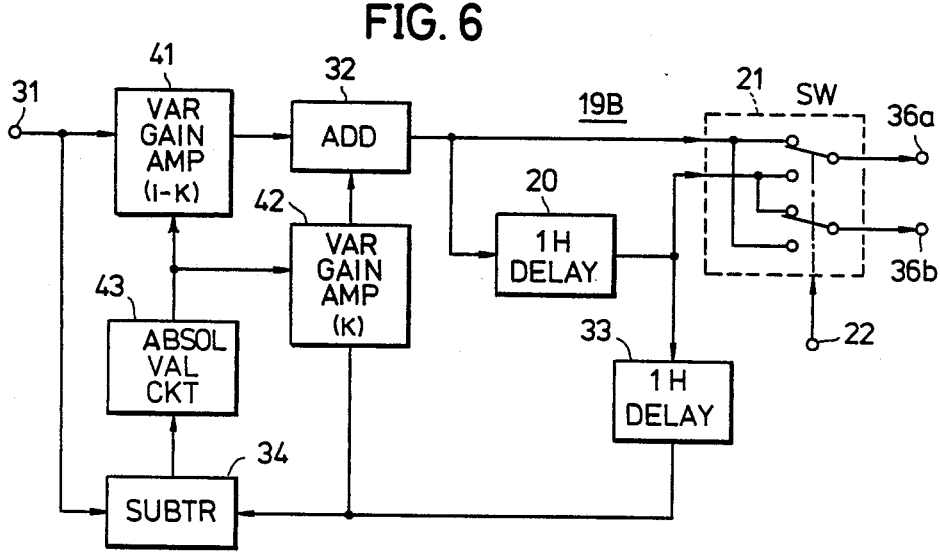

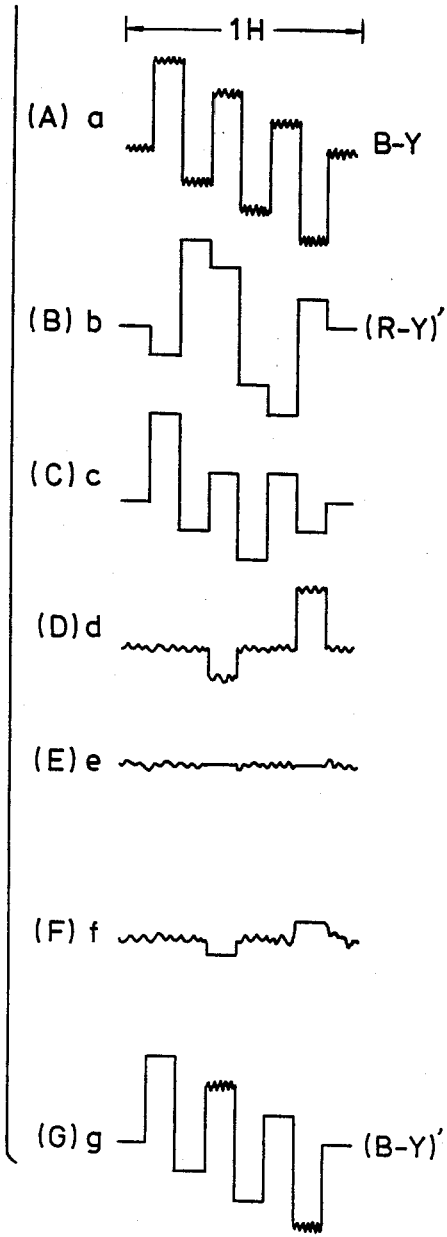
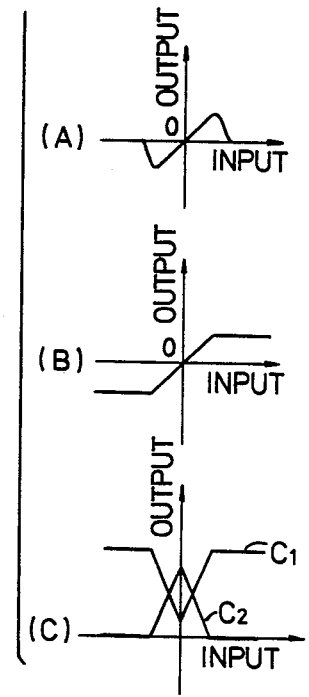

2

4,748,499

1

DEMULTIPLEXING AND NOISE REDUCTION CIRCUIT FOR TIME DIVISION MULTIPLEXED SIGNAL

BACKGROUND OF THE INVENTION

The present invention generally relates to circuits for simultaneously obtaining in parallel signals constituting a time division multiplexed signal, and more particularly relates a circuit for simultaneously obtaining in parallel signals constituting a time division multiplexed signal such as color difference signals constituting a line-sequential color difference signal in a color image pickup device.

Color television cameras using interline transfer charge coupled devices (CCDs) may be divided into two kinds depending on the mode with which the signal charge is stored, that is, a frame integrated mode in which the signal charge is stored for a time period of one frame (1/30 second) by one photodiode and a field integrated mode in which the signal charge is stored for a time period of one field (1/60 second). Compared to the field integrated mode, the frame integrated mode is advantageous in that it is possible to obtain a high vertical resolution. On the other hand, the field integrated mode is advantageous in that it is possible to eliminate the equivalent after image caused by the interlace, that is, a disadvantage of the frame integrated mode, and it is also possible to reduce the flicker in the vicinity of the vertical resolution limit. However, as will be described later on in the present specification in conjunction with the drawings, the light utilization efficiency and the luminance signal characteristic are improved according to the field integrated mode employing a complementary color filter when compared to the frame integrated mode employing a primary color filter, but there is a disadvantage in that the signal-to-noise (S/N) ratio of the color signal is poor because the modulation degree of the color signal decreases. Accordingly, it is desirable to improve the S/N ratio of the color signal.

SUMMARY OF THE INVENTION

Accordingly, it is a general object of the present invention to provide a novel and useful circuit for simultaneously obtaining in parallel signals constituting a time division multiplexed signal, in which the problems described heretofore are eliminated.

Another and more specific object of the present invention is to provide a circuit for simultaneously obtaining in parallel signals constituting a time division multiplexed signal, in which noise of the color signal is reduced and the S/N ratio of the color signal is improved when converting a line-sequential color difference signal into synchronized color difference signals in a single-chip (CCD) color television camera.

Still another object of the present invention is to provide a circuit for simultaneously obtaining in parallel signals constituting a time division multiplexed signal, which is provided with a recursive noise reduction circuit using in common as a delay circuit of the recursive noise reduction circuit a delay circuit which has a delay time of one horizontal scanning period and is originally provided in the circuit for simultaneously obtaining in parallel the signals constituting the line-sequential color difference signal. Since the delay circuit originally provided in the circuit for simultaneously obtaining in parallel the signals constituting the time division multiplexed signal is used as a part of the noise reduction circuit, it is possible to effectively reduce the noise by use of the circuit having a simple circuit construction.

Other objects and further features of the present invention will be apparent from the following detailed description when read in conjunction with the accompanying drawings.

BRIEF DESCRIPTION OF THE DRAWINGS

FIG. 3 is a system block diagram showing an embodiment of the circuit for simultaneously obtaining in parallel signals constituting a time division multiplexed signal according to the present invention;

FIGS. 4(A) through 4(G) show signal waveforms at various parts of the circuit shown in FIG. 3;

FIGS. 5(A) through 5(C) show input versus output characteristics of a non-linear amplifier and an absolute value circuit; and FIG. 6 is a system block diagram showing another embodiment of the circuit for simultaneously obtaining in parallel signals constituting a time division multiplexed signal according to the present invention.

DETAILED DESCRIPTION

Figure 1:
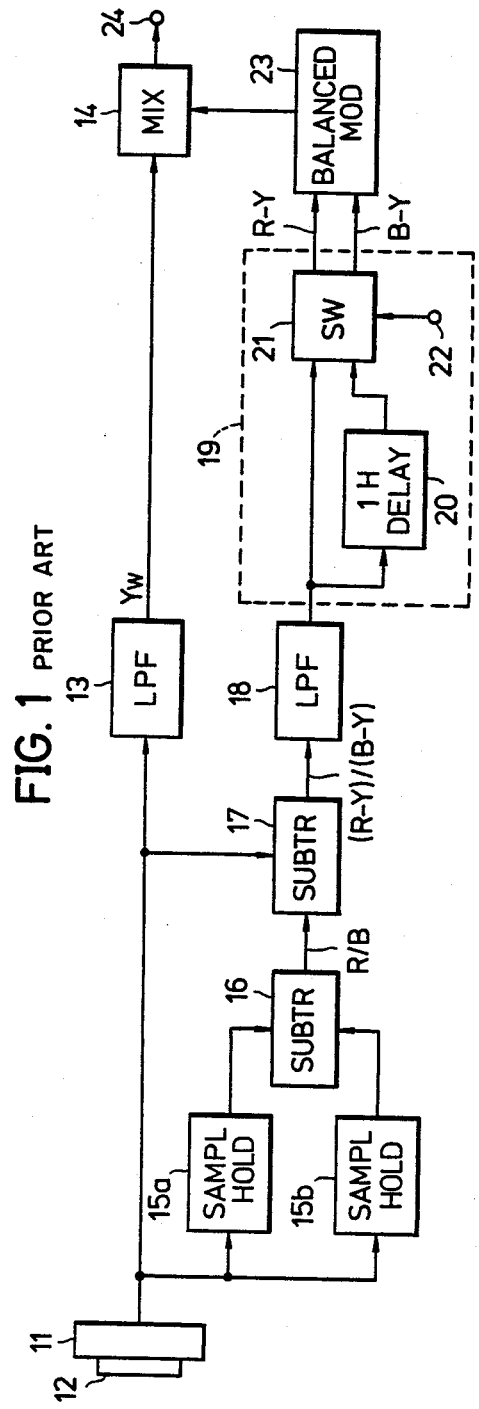
FIG. 1 is a system block diagram showing an example of a video signal processing circuit of a color television camera comprising the conventional circuit for simultaneously obtaining in parallel signals constituting a time division multiplexed signal.
Figure 2B:
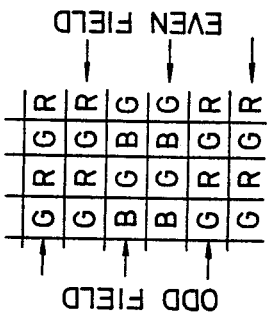
FIGS. 2A and 2B are diagrams for explaining a complementary color filter and a primary color filter, respectively.
Figure 2A:
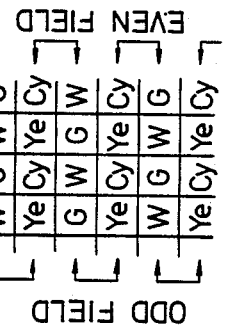

In FIG. 1, an image sensor 11 comprising interline transfer CCDs is provided with a complementary color filter 12 shown in FIG. 2A on a front surface thereof. The charges stored in a photoelectric conversion part of the image sensor 11 for each of the colors are mixed in the interline transfer CCDs for every two picture elements in the vertical direction and are obtained by changing the combination for every odd and even fields.

The signal from the image sensor 11 is supplied to a lowpass filter 13 wherein a luminance signal Yw is obtained. This luminance signal Yw is supplied to a mixing circuit 14. The signal from the image sensor 11 is also supplied to sample and hold circuits 15a and 15b wherein the signal is sampled by sampling pulses having a phase difference of 180° and is then held. For example, signals (W+Ye) and (W+Cy) are obtained from the sample and hold circuit 15a, and signals (G+Cy) and (G+Ye) are obtained from the sample and hold circuit 15b. The signals from the sample and hold circuits 15a and 15b are subjected to a subtraction in a subtracting circuit 16, and red and blue signals R/B are obtained from the subtracting circuit 16. The signals R/B from the subtracting circuit 16 are supplied to a subtracting circuit 17 and are subjected to a subtraction with the signal from the image sensor 11. As a result, color difference signals (R-Y) and (B-Y) are obtained in line-sequence from the subtracting circuit 17. In other words, a line-sequential color difference signal (R-Y)/(B-Y) is obtained from the subtracting circuit as a time division multiplexed signal.

The line-sequential color difference signal (R-Y)/(B-Y) is passed through a lowpass filter 18 and is supplied to a circuit (line-sequence-to-simultaneous conversion circuit) 19 for simultaneously obtaining in parallel the signals constituting the time division multiplexed signal (line-sequential color difference signal (R-Y)/(B-Y)). This circuit 19 comprises a 1H delay circuit 20 and a switching circuit 21, where 1H denotes one horizontal scanning period. The line-sequential color difference signal (R-Y)/(B-Y) supplied to the circuit 19 is supplied directly to the switching circuit 21 on one hand and is supplied to the switching circuit 21 after being delayed by 1H in the 1H delay circuit 20 on the other. The switching circuit 21 is switched over for every line responsive to a switching signal from a terminal 22, and simultaneously produces in parallel the synchronized color difference signals (R-Y) and (B-Y). The color difference signals (R-Y) and (B-Y) from the circuit 19 are supplied to a balanced modulator 23 and is subjected to a balanced modulation by use of a chrominance subcarrier. An output signal of the balanced modulator 23 is supplied to the mixer 14 and is mixed with the luminance signal Yw. Consequently, a composite color video signal is obtained from an output terminal 24.

Generally, it is known that the S/N ratio of the color signal with respect to the luminance signal is poor in the single-chip (CCD) color television camera comprising the field integrated mode CCDs using the complementary color filter 12 shown in FIG. 2A when compared with that using a primary color filter 25 shown in FIG.2B. Description on this will be given hereunder.

The dynamic range of the interline transfer CCDs is determined by the transfer charge quantity of one stage of vertical CCDs, and this charge quantity will be denoted by $Q_{max}$. Incident light is adjusted so that the generated charge quantity becomes $Q_{max}/k$, and this state will be referred to as a standard state, where k is a constant between three and four. In the standard state, the level (luminance signal level) of the two mutually adjacent picture elements of the field integrated mode CCDs in the complementary color filter 12 shown in FIG. 2A can be described by the following.

$$(W + Ye) + (G + Cy) = 4g + 2r + 2b = 2 \times (Q_{max}/k)$$

When it is assumed for convenience' sake that the spectral characteristics of the illumination and the CCDs are flat (g:r:b=1:1:1), the following equation is obtained from the above equation.

$$g=r=b=(\tfrac{1}{4})\times(Q_{max}/k)$$

Hence, the demodulation quantity of the color signal for the signal R, for example, becomes as follows.

$$R = (W + Ye) - (G + Cy) \quad (1)$$
$$= 2r$$
$$= (\tfrac{1}{2}) \times (Q_{max}/k)$$

On the other hand, when similar calculations are carried out for the frame integrated mode CCDs provided with the primary color filter 25 shown in FIG.2B, the level (luminance signal level) of the two mutually adjacent picture elements of the field integrated mode CCDs can be described by the following.

$$G + R = g + r = 2 \times (Q_{max}/k)$$

Hence, when g:r:b=1:1:1, the following equation is obtained.

$$g=r=b=Q_{max}/k$$

Accordingly, the demodulation quantity of the color signal for the signal R, for example, becomes as follows.

$$R = r \quad (2)$$
$$= Q_{max}/k$$

When there is no difference in the noise generated per packet of the CCD transfer charge between the field integrated mode and the frame integrated mode, the S/N ratio of the color signal is proportional to the charge quanity of the demodulated signal. From equations (1) and (2) described before, the S/N ratio is 6 dB poorer when the complementary color filter 12 is used.

Accordingly, the luminance signal characteristic is fine when the complementary color filter 12 is used because the utilization efficiency of the incident light is improved, however, there are disadvantages in that the modulation degree of the color signal decreases and the S/N ratio of the color signal becomes small.

Therefore, according to the present invention, the conventional circuit 19 shown in FIG. 1 is improved so that the signals constituting the line-sequential color difference signal can be obtained simultaneously in parallel, with the noise component reduced and the S/N ratio improved. Description will now be given with respect to the present invention by referring to FIG. 3 and the following figures.

FIG. 3 shows a first embodiment of the circuit for simultaneously obtaining in parallel signals constituting a time division multiplexed signal according to the present invention that replaces the conventional circuit 19 shown in FIG. 1. In FIG. 3, those parts which are the same as those corresponding parts in FIG. 1 will be designated by the same reference numerals. In a circuit 19A, the line-sequential color difference signal (R-Y)/(B-Y) obtained from the lowpass filter 18 shown in FIG. 1 is applied to a terminal 31 and is supplied to an adder 32 which will be described later. An output signal of the adder 32 is supplied to the 1H delay circuit 20 and to the switching cirucit 21. The color difference signal (B-Y) is indicated by a in FIG. 4(A). The output signal of the 1H delay circuit 20, that is, a color difference signal (R-Y)' which has been delayed by 1H and is indicated by b in FIG. 4(B) is supplied to the switching circuit 21 and to a 1H delay circuit 33. A signal c shown in FIG.4(C) is obtained from the 1H delay circuit 33 and is supplied to a subtracting circuit 34 wherein the signal c is subjected to a subtraction with the line-sequential color difference signal (for example, the color difference signal (B-Y)) from the terminal 31.

The color difference signal originally has a strong vertical correlation, and furthermore, the line-sequential color difference signal repeats with a period of 2H. Accordingly, the two color difference signals supplied to the subtracting circuit 34 have strong vertical correlation, and a signal d shown in FIG.4(D) is obtained from the subtracting circuit 34. This signal d comprises an inverted component of noise having no correlation and a non-correlated component (vertical edge) of the color difference signal having no correlation.

The signal d is supplied to a non-linear amplifier 35 having an input versus output characteristic shown in FIG.5(A), for example. The non-linear amplifier 35 suppresses the non-correlated component of the color difference signal and obtains a signal e shown in FIG.4(E). The signal e can substantially be regarded as the inverted phase component of the noise. The noise component e is added with the signal a (for example, the color difference signal (B-Y)) from the terminal 31 in the adder 32. Hence, a color difference signal (B-Y)', which is eliminated of the noise component e, is obtained from the adder 32 and is supplied to the switching circuit 21. The color difference signal (B-Y)' is indicated by g in FIG.4(G). Similarly, the color difference signal (R-Y)', which is eliminated of the noise component, is obtained from the 1H delay circuit 20 and is supplied to the switching circuit 21.

Similarly as in the case of the conventional circuit shown in FIG.1, the switching circuit 21 is switched over for every line by the switching signal from the terminal 22. Hence, the synchronized color difference signals (B-Y)' and (R-Y)' are simultaneously obtained in parallel from terminals 36a and 36b. The signals supplied to the switching circuit 21 is not limited to the signals described heretofore, and it is possible to supply the output signals of the 1H delay circuits 20 and 33 to the switching circuit 21.

The non-linear amplifier 35 may have an input versus output characteristic shown in FIG.5(B). In this case, the output noise component of the non-linear amplifier 35 becomes as indicated by f in FIG.4(F), but it is possible to obtain color difference signals which are eliminated of the noise component similarly as in the case of the above described embodiment.

In addition, in the case where the line-sequential color difference signal applied to the terminal 31 has the polarity thereof inverted for every 2H, an adder is used instead of the subtracting circuit 34 shown in FIG.3.

In the circuit shown in FIG.3, the circuit which does not obtain a signal for the switching circuit 21 from the output of the 1H delay circuit 20 but from the output of the adder 32 or the 1H delay circuit 33 is a so-called recursive noise reduction circuit comprising the adder 32, the 1H delay circuits 20 and 33, the subtracting circuit 34 and the non-linear amplifier 35. When the slope of the input versus output characteristics shown in FIGS.5(A) and 5(B) in the vicinity of the origin is denoted by K and the unit delay operator corresponding to the 1H delay is denoted by $Z^{-1}$, a transfer function H(Z) for the case where the input signal has the vertical correlation with a period of 2H may be described by the following.

$$H(Z) = (1 - K)/(1 - KZ^{-2}) \quad (3)$$
$$= (1 - K)(1 + KZ^{-2} + K^2Z^{-4} + \ldots + K^nZ^{-2n} + \ldots)$$

Since the signal becomes the amplitude average and the random noise becomes the square root of the power sum, a transfer function $H_s(K)$ of the signal and a transfer function $H_n(K)$ of the noise become as follows.

$$H_s(K) = (1 - K)(1 + K + K^2 + K^3 + \ldots + K^n + \ldots)$$
$$= 1$$
$$H_n(K) = [(1 - K)(1 + K^2 + K^4 + K^6 + \ldots + K^{2n} + \ldots)]^{\frac{1}{2}}$$
$$= [(1 - K)/(1 + K)]^{\frac{1}{2}}$$

Accordingly, with respect to the signal having the vertical correlation, it is possible to reduce the noise by making K approach 1. On the other hand, with respect to the signal having no vertical correlation, the term $KZ^{-2}$ and the subsequent terms in the equation (3) become negligible by making K small, and it is possible to reduce the effects of the past signal and reduce the smear in the vertical direction of the picture.

FIG.6 shows a second embodiment of the circuit according to the present invention. In FIG.6, those parts which are the same as those corresponding parts in FIG.3 are designated by the same reference numerals, and description thereof will be omitted. The color difference signal applied to the terminal 31 is multiplied by a gain (1-K) in a variable gain amplifier 41 and is supplied to the adder 32. On the other hand, the output signal of the 1H delay circuit 33 is multiplied by a gain K in a variable gain amplifier 42 and is supplied to the adder 32. The output signals of the variable gain amplifiers 41 and 42 are added in the adder 32, and the output signal of the adder 32 is supplied to the 1H delay circuit 20 and the switching circuit 21.

In this case, the output signal of the 1H delay circuit 33 and the signal applied to the terminal 31 are subjected to a subtraction in the subtracting circuit 34. An output signal of the subtracting circuit 34 is supplied to an absolute value circuit 43 having an input versus output characteristic shown in FIG.5(C). Control signals c1 and c2 dependent on the difference between the signals supplied to the subtracting circuit 34 are obtained from the absolute value circuit 43 and are supplied to the respective variable gain amplifiers 41 and 42 so as to variably control the value of K. The gains are controlled so that K becomes small when the difference obtained from the subtracting circuit 34 exceeds a predetermined threshold value.

Other operations of the circuit shown in FIG.6 are similar to those of the circuit shown in FIG.4, and description thereof will be omitted.

In each of the embodiments described heretofore, an adder is used instead of the subtracting circuit 34 in the case where the time division multiplexed signal applied to the terminal 31 has the polarity thereof inverted for every predetermined period of 2H, for example.

Further, the present invention is not limited to these embodiments, but various variations and modifications may be made without departing from the scope of the present invention.

What is claimed is:

1. A circuit for simultaneously obtaining in parallel signals constituting a time division multiplexed signal, said circuit comprising:
   adding means supplied with an input time division mulitplexed signal, said time division mulitplexed signal having been time-division-multiplexed with a constant repetition period corresponding to that of a television signal and having correlation for every said repetition period;
   a first delay circuit supplied with an output signal of said adding means and having a delay time corresponding to a duration of one of the signals constituting said time division multiplexed signal;

a switching circuit supplied with an output signal of said first delay circuit and said output signal of said adding means for carrying out a switching operation every said constant repetition period so as to simultaneously output signals in parallel;

a second delay circuit supplied with the output signal of said first delay circuit and having a delay time identical to that of said first delay circuit;

feedback means supplied with said input time division multiplexed signal and an output signal of said second delay circuit for producing a feedback signal depending on a difference signal between said input time division mulitplexed signal and the output signal of said second delay circuit, said feedback signal being supplied to said adding means so as to be added with said input time division multiplexed signal.

2. A circuit as claimed in claim 1 in which said input time division mulitplexed signal is a line-sequential color difference signal, said first and second delay circuits having a delay time corresponding to one horizontal scanning period, said switching circuit carrying out the switching operation for every one horizontal scanning period.

3. A circuit as claimed in claim 2 which is used in an image pickup device comprising a solid state image sensor provided with a complementary color filter on a front surface thereof and circuit means for obtaining the line-sequential color difference signal from an output signal of said solid state image sensor.

4. A circuit as claimed in claim 1 in which said feedback means comprises a subtraction circuit for producing the difference signal between said input time division multiplexed signal and the output signal of said second delay circuit.

5. A circuit as claimed in claim 4 in which said feedback means comprises a non-linear amplifier supplied with the difference signal for producing the feedback signal, said non-linear amplifier having a non-linear input versus output characteristic.

6. A circuit as claimed in claim 4 in which said adding means comprises a first variable gain amplifier supplied with said input time division multiplexed signal and having a variable gain, and said feedback means comprises an absolute value circuit supplied with the difference signal and having a non-linear input versus output characteristic, said gain of said first variable gain amplifier being varied responsive to an output signal of said absolute value circuit, and a second variable gain amplifier supplied with the output signal of said second delay circuit for producing said feedback signal, said second variable gain amplifier having a gain varied responsive to the output signal of said absolute value circuit.

7. A circuit as claimed in claim 6 in which said first variable gain amplifier multiplies a gain (1-K) to said input time division multiplexed signal and said second variable gain amplifier muliplies a gain K to the output signal of said second delay circuit, said gains of said first and second variable gain amplifiers being controlled by the output signal of said absolute value circuit so that a value of K becomes small when an output signal value of said subtraction circuit exceeds a threshold value.

* * * * *